United States Patent Office 3,239,938
Patented Mar. 15, 1966

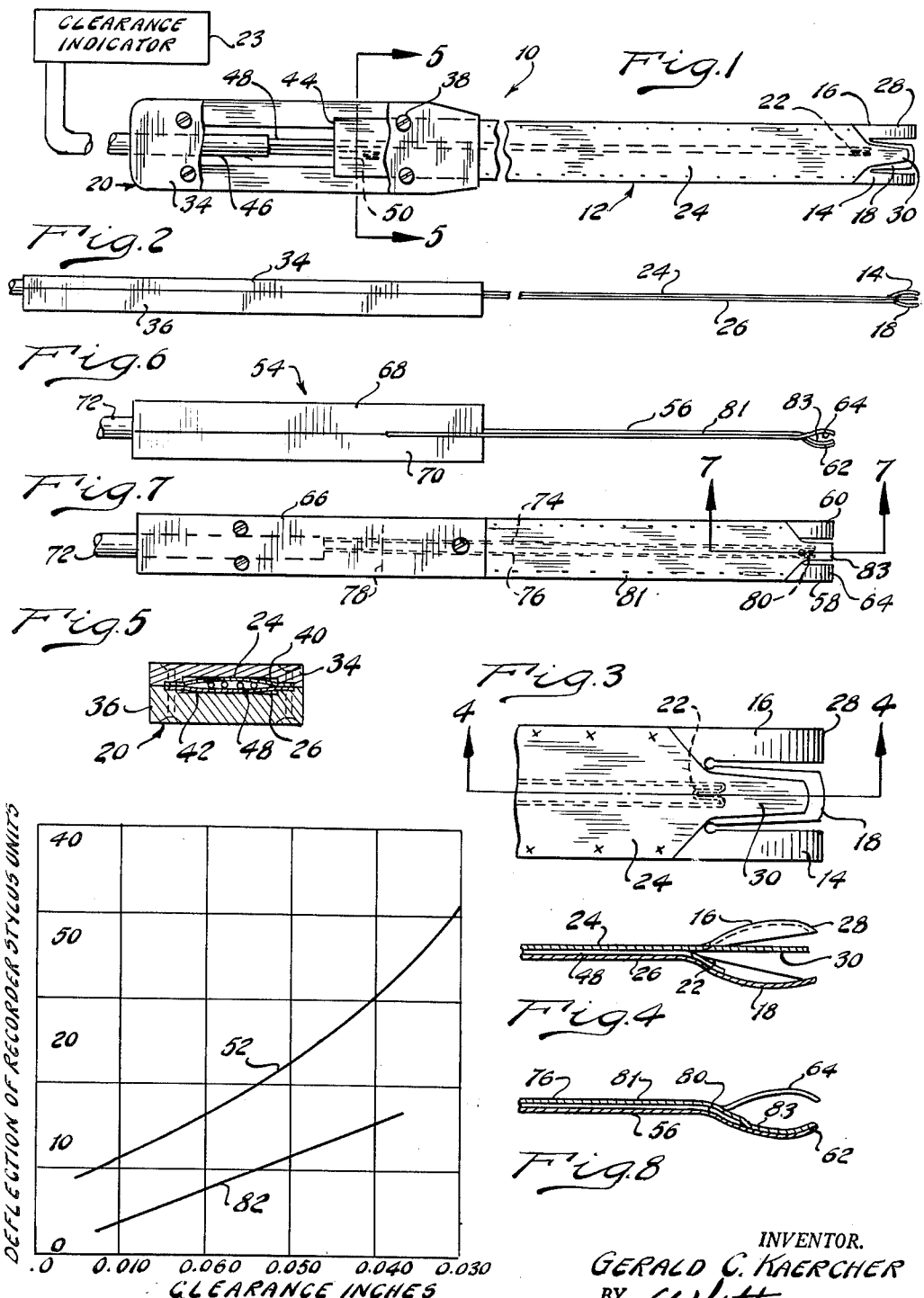

3,239,938
CLEARANCE MEASURING PROBE
Gerald C. Kaercher, Detroit, Mich., assignor to The Detroit Edison Company, Detroit, Mich., a corporation of New York
Filed Mar. 5, 1962, Ser. No. 177,410
15 Claims. (Cl. 33—147)

The invention relates to measuring instruments and refers more specifically to a probe for rapidly and accurately measuring the clearance between closely spaced adjacent objects.

It is often necessary to measure the clearance between closely spaced objects which are located centrally of similarly closely spaced objects or otherwise are inaccessible to known measuring apparatus. Thus, for example, prior to the present invention no practical device was available to measure the clearance between adjacent fuel pins is experimental "egg-crate"-type core subassemblies for use in atomic power development since the fuel pins in such core assemblies are arranged in a plurality of closely spaced rows each of which rows includes a plurality of separate pins.

Available measuring instruments for such devices are deficient in that they are not capable of being inserted within the nominal clearance between the fuel pins which may be in the order of .04 inch, or they are complicated whereby much time is required in measuring the desired clearances which may include, for example, four thousand individual readings on a single core subassembly, or they lack the required accuracy of one or two percent.

It is therefore a purpose of the present invention to provide an improved measuring instrument for measuring the clearance between closely spaced adjacent objects.

Another object is to provide a clearance probe comprising an elongated body member having a cantilevered portion on one end thereof which end is adapted to be inserted between closely spaced objects with the body member and cantilevered portion respectively in contact with adjacent objects whereby the cantilevered portion is deflected relative to the body member an amount representative of the clearance between the adjacent objects and means for determining the clearance between the adjacent objects in accordance with the deflection of the cantilevered portion of the body member.

Another object is to provide a clearance probe for measuring the clearance between closely spaced adjacent objects comprising an elongated relatively thin body member having cantilevered portions on one end thereof extending in opposite directions which one end is adapted to be inserted between the adjacent objects, whereby the cantilevered portions are deflected an amount proportional to the clearance between the objects and a strain gage secured to the base of one of the cantilevered portions responsive to the strain at the base of the one cantilevered portion on deflection thereof to provide an electrical resistance change proportional to the deflection of the one cantilevered portion, and means for providing an indication of the clearance between the adjacent objects in accordance with the resistance change.

Another object is to provide a clearance measuring probe as set forth above and further including a second strain gage secured to an unstressed portion of the body member for compensating for the effects of temperature change on the resistance change of the strain gage secured to the base of the one cantilevered portion of the body member.

Another object is to provide a clearance measuring probe as set forth above wherein the one end of the probe is comprised of three cantilevered portions two of which extend in one direction from the axis of the body member and the third of which extends in the opposite direction and is positioned between the said two cantilevered portions.

Another object is to provide a clearance measuring probe as set forth above wherein the extreme outer ends of the cantilevered portions are arcuate and include concave adjacent sides and convex sides outwardly of the body member.

Another object is to provide a clearance measuring probe as set forth above wherein the said cantilevered portions are dish-shaped to provide point contact with objects between which the one end of the body member is inserted.

Another object is to provide a clearance measuring probe which is simple in construction, economical to manufacture and efficient in use.

Other objects and features of the invention will become apparent as the description proceeds, especially when taken in conjunction with the accompanying drawings, illustrating a preferred embodiment of the invention, wherein:

FIGURE 1 is a partially broken away plan view of a clearance measuring probe constructed in accordance with the invention and illustrating an indicator connected thereto.

FIGURE 2 is an elevation view of the clearance measuring probe illustrated in FIGURE 1.

FIGURE 3 is an enlarged plan view of one end of the clearance measuring probe illustrated in FIGURE 1.

FIGURE 4 is a section through the end of the clearance measuring probe illustrated in FIGURE 3 taken substantially on the line 4—4 in FIGURE 3.

FIGURE 5 is a cross section of the clearance measuring probe illustrated in FIGURE 1 taken substantially on the line 5—5 in FIGURE 1.

FIGURE 6 is an elevation view of a modification of the clearance measuring probe shown in FIGURE 1.

FIGURE 7 is a plan view of the modified clearance measuring probe illustrated in FIGURE 6.

FIGURE 8 is a section through the end of the clearance measuring probe illustrated in FIGURE 7 taken substantially on the line 8—8 in FIGURE 7.

FIGURE 9 is a graph illustrating calibration curves for the clearance measuring probes illustrated in FIGURES 1 and 6.

With particular reference to the figures of the drawings one embodiment of the present invention will now be disclosed.

The clearance measuring probe 10 illustrated in FIGURE 1 includes a body member 12 having cantilevered portions 14 and 16 extending oppositely from the cantilevered portion 18 with respect to the generally flat plane of the body member 12 and the insulating handle 20. A strain gage 22 is secured to the base of the cantilevered portion 18 of the body 12 and is responsive to strain of the cantilevered portion 18 of body member 12 at its base to vary the clearance representation of an electrical indicator 23 to which the strain gage 22 is electrically connected.

Thus in operation when it is desired to measure the clearance between adjacent objects even though they may be located centrally of a plurality of other objects the thin substantially flat body member 12 of the probe 10 is inserted between the plurality of objects until the cantilevered portions 14 and 16 and the cantilevered portion 18 are inserted between and deflected by only the objects the clearance between which it is desired to measure. The deflection of the cantilevered member 18 and therefore the strain thereof as sensed by the strain gage 22 will then be representative of the clearance between the objects and may be determined from the clearance indicator reading with the aid of the calibration chart shown in FIGURE 8.

More specifically as shown in FIGURES 1–5 the body member 12 of the clearance measuring probe 10 comprises a pair of elongated rectangular members 24 and 26 which may be of 5-mil thickness and of stainless steel. As shown best in FIGURE 1 the members 24 and 26 are secured together at the edges by convenient means such as spot-welding.

The end 28 of the member 26 is slotted longitudinally to provide the cantilevered portions 14, 16 and 18 as best shown in FIGURE 3. The cantilevered portions 14 and 16 extend at an angle to the substantially flat body member 12 toward the member 24 as shown best in FIGURE 4 while the cantilevered portion 18 extends at an angle to the body member 12 away from the member 24. The portions 14, 16 and 18 of the member 26 are dish-shaped as shown best in FIGURE 4 to provide point contact with objects the clearance between which it is desired to measure.

The end 30 of the member 24 of the body member 12 is shaped as shown best in FIGURES 1 and 4 to extend over the portion 18 of the member 26. Thus the end 30 of the member 24 provides protection for the strain gage 22 secured to the base of the cantilevered portion 18 of member 26 between the cantilevered portion 18 of member 26 and the end 30 of the member 24 as shown best in FIGURE 4.

The handle 20 of the clearance measuring probe 10 is constructed of members 34 and 36 of insulating material which are secured together in assembly by convenient means such as screws 38. The handle members 34 and 36 are provided with recesses 40 and 42 therein as shown best in FIGURE 5 for receiving the end 44 of the body 12 of the clearance measuring probe. The insulating cable 46 is also secured within the handle of the clearance measuring probe 10 in a known manner to provide electric conductors 48 for use in conjunction with the strain gage 22 and the temperature compensating strain gage 50.

The strain gage 22 is secured to the surface of the member 26 of the clearance measuring probe body member 12 at the base of the cantilevered portion 18 thereof by convenient means such as a suitable adhesive. The strain gage 22 is a known article of commerce and as such is not in itself a part of the present invention. The strain gage 22 acts to vary the resistance in an electrical bridge circuit which may be included in or supplied separately from the clearance indicator 23 which may be a direct-writing oscillograph or portable strain indicator to provide in conjunction therewith an indication of the degree of deflection of the cantilevered portion 18 of the clearance measuring probe. The clearance indicator 23 is similarly not in itself a part of the present invention and is a well known article of commerce which will not be discussed in detail.

The strain gage 50 is similar to the strain gage 22 except that the strain gage 50 is secured to the member 26 of the body member 12 of the clearance measuring probe 10 at a location where the member 26 is not strained. The strain gage 50 is also connected in the previously indicated bridge circuit through the conductors 48 to compensate for the effects of temperature on the clearance measuring probe 10.

With the construction described above it is first required to make a calibration curve for each probe 10 to determine the clearance between adjacent objects which will cause a particular deflection of the cantilevered portion 18 of the member 26 as sensed by the strain gage 22 and indicated on the clearance indicator 23 by deflection of a recording stylus (not shown) for example on placing the ends 28 and 30 of the members 26 and 24 between objects. The deflection of the cantilevered member 18 shaped as shown in FIGURES 3 and 4 will be somewhat non-linear as the clearance between the objects to be measured increases as shown on curve 52 in FIGURE 8 due to the particular shape of the cantilevered portion 18.

After a calibration curve such as the curve 52 has been established for a particular clearance measuring probe 10 the operation of the probe 10 simply requires the insertion of the ends 28 and 30 of the body portion 12 of the clearance measuring probe 10 between the objects the clearance between which it is desired to measure. The clearance between the objects may then be read directly from the calibration curve 52 with reference to the reading of the clearance indicator 23.

A simplified clearance measuring probe 54 similar to the clearance measuring probe 10 is illustrated in FIGURES 6 and 7. The clearance measuring probe 54 comprises the body member 56 constructed of a single piece of 5-mil thick low carbon steel shim-stock which is split at the end 58 to provide the cantilevered portions 60, 62 and 64. Again the cantilevered portions 60 and 64 extend at an angle to the plane of the body member 56 opposite to the direction in which the cantilevered portion 62 extends. The ends of each of the cantilevered portions 60, 62 and 64 are arcuate as shown best in FIGURE 6 to facilitate insertion of the body member 56 between closely spaced objects.

The handle 66 of the clearance measuring probe 54 is again constructed of two members 68 and 70 of insulating material such as Bakelite. The members 68 and 70 clamp therebetween the end 78 of the body member 56 and the electric cable 72 having the conductors 74 and 76 therein.

A strain gage 80 is secured to the base of the cantilevered portion 62 of the probe body 56 to sense the deflection thereof. The strain gage 80 may be connected through the conductors 74 and 76 and the cable 72 to a clearance indicator such as indicator 23 illustrated in FIGURE 1 which is operable to provide an indication of the deflection of the cantilevered portion 62 of the body 56 of the clearance measuring probe 54 on insertion of the end 58 of the probe 54 between closely spaced objects.

The strain gage 80 and conductors 74 and 76 are covered by a protective member 81 of 1-mil thick shim stock. The member 81 may be secured to the body member 56 by spot welds along the edges except for the end portion 83 thereof which is reduced in width as shown in FIGURE 7, is bent to conform to portions 62 of member 56 and is secured to the strain gage 22 and the portion 62 of member 56 by a suitable adhesive. Thus in the modified probe 54 the deflection measured is actually the combined deflection of portion 62 of member 56 and the portion 83 of member 81.

Due to the particular shape of the end 58 of the probe 54 the calibration curve of the probe is substantially linear as shown best by curve 82 in FIGURE 8. In use it will be understood that the angle between the cantilevered portions of the probes 10 and 54 and the general planes of the body members 12 and 56 respectively must be relatively maintained after calibration and the cantilevered portions of the probes must not be deflected beyond their elastic limit.

The drawings and the foregoing specification constitute a description of the improved clearance measuring probe in such full, clear, concise and exact terms as to enable any person skilled in the art to practice the invention, the scope of which is indicated by the appended claims.

What I claim as my invention is:

1. A probe for measuring the clearance between closely spaced adjacent objects comprising a thin elongated member one end of which is split longitudinally to provide three separate cantilevered portions spaced apart in the general plane of the elongated member adapted to be inserted between the adjacent objects to produce deflection of the center cantilevered portion by an amount representative of the clearance between the adjacent objects and means operably associated with the center cantilevered end portion of said elongated member for sensing the deflection of said center cantilevered portion of the elongated member on insertion of said one end of the elongated member between the adjacent objects.

2. A probe for measuring the clearance between closely spaced adjacent objects comprising a first elongated member which is thin and flat in the general plane thereof and which has a longitudinally split end providing a central and two outer cantilevered end portions, a second elongated member which is thin and flat in the general plane thereof and which has a cantilivered end, said cantilevered end of said second elongated member fitting between the outer end portions of the first elongated member, said elongated members being secured together with the two outer end portions of the first elongated member and the central end portion thereof extending at similar angles to the general plane of the elongated members in opposite directions, toward and away from the second elongated member respectively whereby the end portions of the elongated members are adapted to be inserted between the adjacent objects to produce deflection of the central end portion of the first elongated member representative of the clearance between the adjacent objects, means operably associated with the central end portion of the first elongated member for sensing the deflection of said central end portion on insertion of ends of the elongated members between the adjacent objects and an insulating handle secured to the other ends of the elongated members.

3. Structure as set forth in claim 2 wherein the means for sensing the deflection of the central end portion of said first elongated member comprises a strain gage secured to said first elongated member at the base of the central end portion thereof having coinductors extending therefrom between the elongated members into the handle and wherein a second strain gage is secured to the first elongated member within the handle to provide temperature compensation for the clearance measuring probe and an indicator is provided connected to both said strain gages for providing a visual indication of the deflection of the central end portion of said first elongated member as a measure of the clearance of the adjacent objects.

4. Structure as claimed in claim 2 wherein the two outer end portions of the first elongated member and the central portion thereof have arcuate extremities concave toward the general plane of the elongated members to permit easy insertion of the elongated members between closely spaced objects and are dish-shaped concave toward the general plane of the elongated members to provide point contact with objects between which they are inserted.

5. Structure as set forth in claim 1 wherein the center cantilivered portion of the elongated member and the other cantilevered portions thereof extend at substantially the same angle in opposite directions from the elongated member and are arcuate in opposite directions to be concave toward each other at substantially the same curvature whereby line contact in a plane substantially perpendicular to the elongated member is provided with the separate cantilevered portions on insertion of the one end of the probe between adjacent parallel objects.

6. Structure as claimed in claim 2 wherein the two outer end portions of the first elongated member and the central portion thereof have arcuate extremities concave toward the general plane of the elongated members to permit easy insertion of the elongated members between closely spaced objects.

7. Structure as set forth in claim 6 wherein the curvature of the arcuate extremities of the first elongated member are identical whereby the end portions of the first elongated member make contact with objects between which they are inserted along parallel lines lying in a plane perpendicular to the general plane of the elongated members of the probe.

8. A probe for measuring the clearance between closely spaced adjacent objects comprising a thin elongated member one end of which is split longitudinally to provide three separate cantilevered portions spaced apart in the general plane of the elongated member with the center cantilevered portion and the other cantilevered portions extending at substantially the same angle in opposite directions from the elongated member, said one end of the elongated member being adapted to be inserted between the adjacent objects to produce deflection of the center cantilevered portion by an amount representative of the clearance between the adjacent objects and means operably associated with the center cantilevered portion of said elongated member for sensing the deflection of said center cantilevered portion on insertion of said one end of the elongated member between the adjacent objects.

9. A probe for measuring the clearance between closely spaced adjacent objects comprising a thin elongated member one end of which is split longitudinally to provide three separate cantilevered portions spaced apart in the general plane of the elongated member, said cantilevered portions of the one end of the elongated member being arcuate in opposite directions to be concave toward each other at substantially the same curvature whereby line contact in a plane substantially perpendicular to the elongated member is provided with the separate cantilevered portions on insertion of the one end of the elongated member between adjacent parallel objects to produce deflection of the center cantilevered portion by an amount representative of the clearance between the adjacent objects and means operably associated with the center cantilevered end portion of said elongated member for sensing the deflection of said center cantilivered portion on insertion of said one end of the elongated member for sensing the deflection of said center cantilevered portion on insertion of said one end of the elongated member between the adjacent objects.

10. A probe for measuring the clearance between closely spaced adjacent objects comprising an elongated member which is thin and flat in the general plane thereof and one end of which is split longitudinally to provide a pair of cantilevered portions in spaced apart relation in the general plane of the elongated member and relative thereto for insertion between the adjacent objects to produce strain in one of said cantilivered portions representative of the clearance between the adjacent objects, and means operably associated with said elongated member for sensing the strain of said one of said cantilevered portions of the elongated member on insertion of said one end of the elongated member between the adjacent objects.

11. Structure as set forth in claim 10 wherein said cantilevered end portions of the elongated member extend in opposite directions from the general plane of the elongated member.

12. Structure as claimed in claim 10 wherein the cantilevered end portions of the elongated member extends at substantially the same angle from the general plane of the elongated member in opposite directions therefrom.

13. Structure as set forth in claim 10 wherein the cantilevered end portions of the elongated member have arcuate tips which are concave toward the general plane of the elongated member.

14. Structure as claimed in claim 10 wherein the cantilevered end portions of the elongated member have dished ends which are concave toward the general plane of the elongated member.

15. Structure as claimed in claim 10 wherein the means for sensing the strain of said one cantilevered end portion comprises an electric strain gauge secured to the elongated member at the base of the one cantilevered end portion.

References Cited by the Examiner

UNITED STATES PATENTS

| | | | |
|---|---|---|---|
| 953,282 | 3/1910 | Nash | 33—178 |
| 2,344,642 | 3/1944 | Ruge | 73—88.5 X |
| 2,429,511 | 10/1947 | Emery | 33—178 |
| 2,487,681 | 11/1949 | Weisselberg. | |
| 2,495,797 | 1/1950 | Whitlock et al. | 33—178 |
| 2,642,671 | 6/1953 | Graham et al. | 33—178 |
| 2,656,613 | 10/1953 | Goble | 33—178 |
| 2,725,486 | 11/1955 | Walstrom. | |
| 2,744,181 | 5/1956 | Rea | 73—88.5 X |
| 2,832,149 | 4/1958 | Fisk | 33—147 |
| 2,994,962 | 8/1961 | Lebourg | 33—178 |
| 3,007,252 | 11/1961 | Munn | 33—178 |

ISAAC LISANN, *Primary Examiner.*